(12) United States Patent
Hsu et al.

(10) Patent No.: US 11,442,506 B1
(45) Date of Patent: Sep. 13, 2022

(54) EXTERNAL DISPLAY MODULE

(71) Applicant: Quanta Computer Inc., Taoyuan (TW)

(72) Inventors: Chia-Jung Hsu, Taoyuan (TW);
Chin-Kuo Wang, Taoyuan (TW);
Yi-Chieh Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/361,749

(22) Filed: Jun. 29, 2021

(30) Foreign Application Priority Data

May 3, 2021 (TW) .................................. 110115837

(51) Int. Cl.
*G06F 1/16* (2006.01)

(52) U.S. Cl.
CPC ............ *G06F 1/1654* (2013.01); *G06F 1/162* (2013.01); *G06F 1/1616* (2013.01); *G06F 1/1624* (2013.01); *G06F 1/1641* (2013.01); *G06F 1/1647* (2013.01); *G06F 1/1681* (2013.01)

(58) Field of Classification Search
CPC .... G06F 1/1616; G06F 1/1624; G06F 1/1641; G06F 1/162; G06F 1/1649; G06F 1/1654; G06F 1/1647; G06F 1/1652; G06F 1/1681; G06F 1/16; G06F 1/1637
See application file for complete search history.

(56) References Cited

U.S. PATENT DOCUMENTS

| | | | | |
|---|---|---|---|---|
| 8,018,715 | B2 * | 9/2011 | Chang | G06F 1/1647 361/679.04 |
| 10,082,832 | B1 * | 9/2018 | Wang | G06F 1/1681 |
| 10,817,020 | B1 * | 10/2020 | DeMaio | G06F 3/1423 |
| 2004/0244146 | A1 * | 12/2004 | Park | G06F 1/1692 16/239 |
| 2006/0082518 | A1 * | 4/2006 | Ram | G06F 1/1635 345/1.1 |
| 2011/0141679 | A1 * | 6/2011 | Dai | G06F 1/162 361/679.27 |
| 2018/0189012 | A1 * | 7/2018 | Fang | G06F 1/1649 |
| 2019/0332146 | A1 * | 10/2019 | Yao | G06F 1/1656 |
| 2021/0405702 | A1 * | 12/2021 | Hudgins | G06F 1/166 |

* cited by examiner

*Primary Examiner* — Dismery Mercedes
(74) *Attorney, Agent, or Firm* — McClure, Qualey & Rodack, LLP

(57) ABSTRACT

An external display module is provided, which is adapted to be detachably connected to an electronic device. The external display module includes a module base and a first screen unit. The module base includes a first base side, two first tracks and at least one first slot. The first screen unit is rotatably connected to the module base, wherein the first screen unit includes a first screen, a first shaft, at least one first guiding member and two first blocks, the first shaft is disposed on the edge of the first screen unit, the first guiding member is affixed to the first shaft and is rotated with the first shaft, the first block is connected to the first shaft, the first guiding member is inserted into the first slot and is guided by the first slot, and the first block is adapted to slide in the first track.

10 Claims, 14 Drawing Sheets

EXTERNAL DISPLAY MODULE

CROSS REFERENCE TO RELATED APPLICATIONS

This application claims priority of Taiwan Patent Application No. 110115837, filed on May 3, 2021, the entirety of which is incorporated by reference herein.

BACKGROUND OF THE INVENTION

Field of the Invention

The present invention relates to a display module, and in particular to an external display module.

Description of the Related Art

The external display module is adapted to be connected to the cover of the notebook computer, and the user of the notebook computer can therefore operate the notebook computer with two or three screens. The external display module has a module base and a screen unit. The screen unit pivots on the module base. The screen unit is rotatable between a folded orientation and an unfolded orientation relative to the module base. Conventionally, to prevent the module base from interfering with the screen unit during rotation, the edge of the screen unit is far away from the side of the module base. When the user operates the notebook computer, the gap between the screen of the external display module and the screen of the notebook computer causes visual discontinuity.

BRIEF SUMMARY OF THE INVENTION

Embodiments of the invention are provided to address the aforementioned difficulty.

In one embodiment, an external display module is provided, which is adapted to be detachably connected to an electronic device. The external display module includes a module base and a first screen unit. The module base includes a first base side, two first tracks and at least one first slot. The first screen unit is rotatably connected to the module base, wherein the first screen unit includes a first screen, a first shaft, at least one first guiding member and two first blocks, the first shaft is disposed on the edge of the first screen unit, the first guiding member is affixed to the first shaft and is rotated with the first shaft, the first block is connected to the first shaft, the first guiding member is inserted into the first slot and is guided by the first slot, and the first block is adapted to slide in the first track. While the first screen unit is being rotated from a first folded orientation to a first unfolded orientation, the edge of the first screen unit is moved toward the first base side.

In one embodiment, the first screen unit comprises two first extending members, the first shaft is rotatably connected to the first extending members, and the first block is affixed to one of the first extending members.

In one embodiment, the first track extends in a first direction, the first guiding member is inserted into the first slot in a second direction, and the second direction is perpendicular to the first direction.

In one embodiment, while the first screen unit is being rotated from the first folded orientation to the first unfolded orientation, the first guiding member is guided from a first slot end of the first slot to a second slot end of the first slot, the second slot end is adjacent to the first base side relative to the first slot end, and an included angle is formed between an extending direction of the first slot and the first direction.

In one embodiment, the included angle is between 20° and 70°.

In one embodiment, the external display module further comprises a second screen unit. The second screen unit is rotatably connected to the module base, wherein the second screen unit comprises a second screen, a second shaft, at least one second guiding member and two second blocks, the second shaft is disposed on the edge of the second screen unit, the second guiding member is affixed to the second shaft and is rotated with the second shaft, and the second block is connected to the second shaft. The module base further comprises a second base side, two second tracks and at least one second slot, the second guiding member is inserted into the second slot and is guided by the second slot, and the second block is adapted to slide in the second track, wherein during the rotation of the second screen unit from a second folded orientation to a second unfolded orientation, the edge of the second screen unit is moved toward the second base side.

In one embodiment, when the first screen unit is in the first folded orientation and the second screen unit is in the second folded orientation, at least a portion of the first screen unit is located between the second screen unit and the module base.

In one embodiment, the second screen unit further comprises a unit pushing portion, the unit pushing portion is disposed on the edge of the second screen unit, and while the second screen unit is being rotated from the second folded orientation to the second unfolded orientation, the unit pushing portion pushes the side of the first screen unit to rotate the first screen unit from the first folded orientation.

In one embodiment, the second screen unit comprises two second extending members, the second shaft is rotatably connected to the second extending members, and the second block is affixed to the second extending member, wherein while the second screen unit is being rotated from the second folded orientation to the second unfolded orientation, the second guiding member is guided from a third slot end of the second slot to a fourth slot end of the second slot, and the fourth slot end is adjacent to the second base side relative to the third slot end.

In one embodiment, the second slot comprises an idling section and a guiding section, the idling section is located on the third slot end, wherein while the unit pushing portion pushes the first screen unit, the second guiding member is moved in the idling section, and the edge of the second screen unit stays without moving toward the second base side, wherein after the second guiding member enters the guiding section and is moved toward the fourth slot end, the edge of the second screen unit is moved toward the second base side.

Utilizing the first track, the first slot, the first guiding member and the first block of the embodiment of the invention, the edge of the first screen unit is moved toward the first base side while the first screen unit is being rotated from the first folded orientation to the first unfolded orientation. The first screen unit is prevented from being interfered with by the module base during rotation. In the unfolded state, the gap between the first screen of the first screen unit and the screen of the notebook computer is decreased, and the operation experience of user can be improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
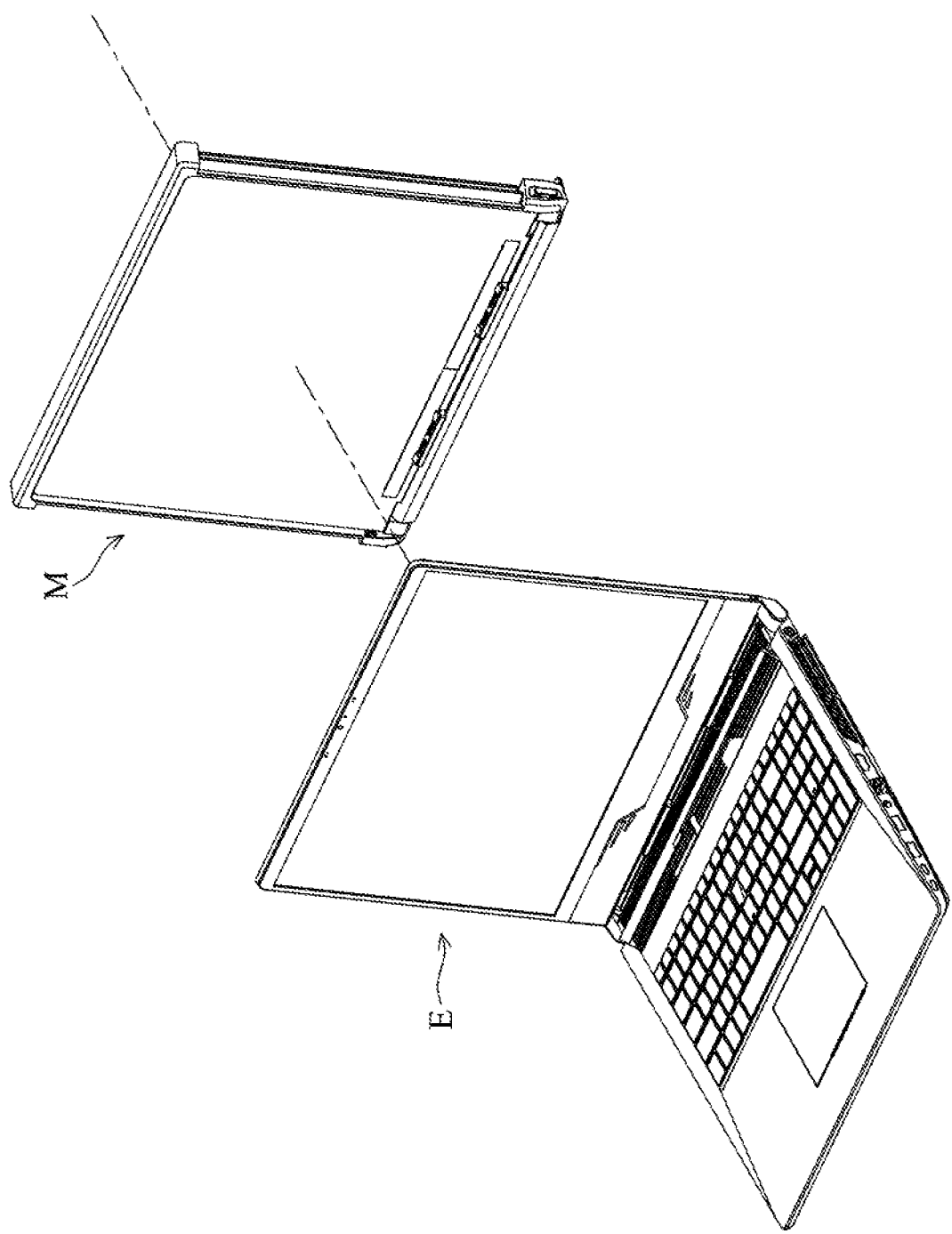
FIG. 1 shows an external display module and an electronic device of an embodiment of the invention.

FIG. 1 shows an external display module and an electronic device of an embodiment of the invention. FIGS. 2A, 2B, 2C and 2D show the rotation of the screen units of the external display module of the embodiment of the invention. With reference to FIGS. 1, 2A, 2B, 2C and 2D, the external display module M is adapted to be detachably connected to the electronic device E. The external display module M includes a module base 3 and a first screen unit 1.

Figure 3A:
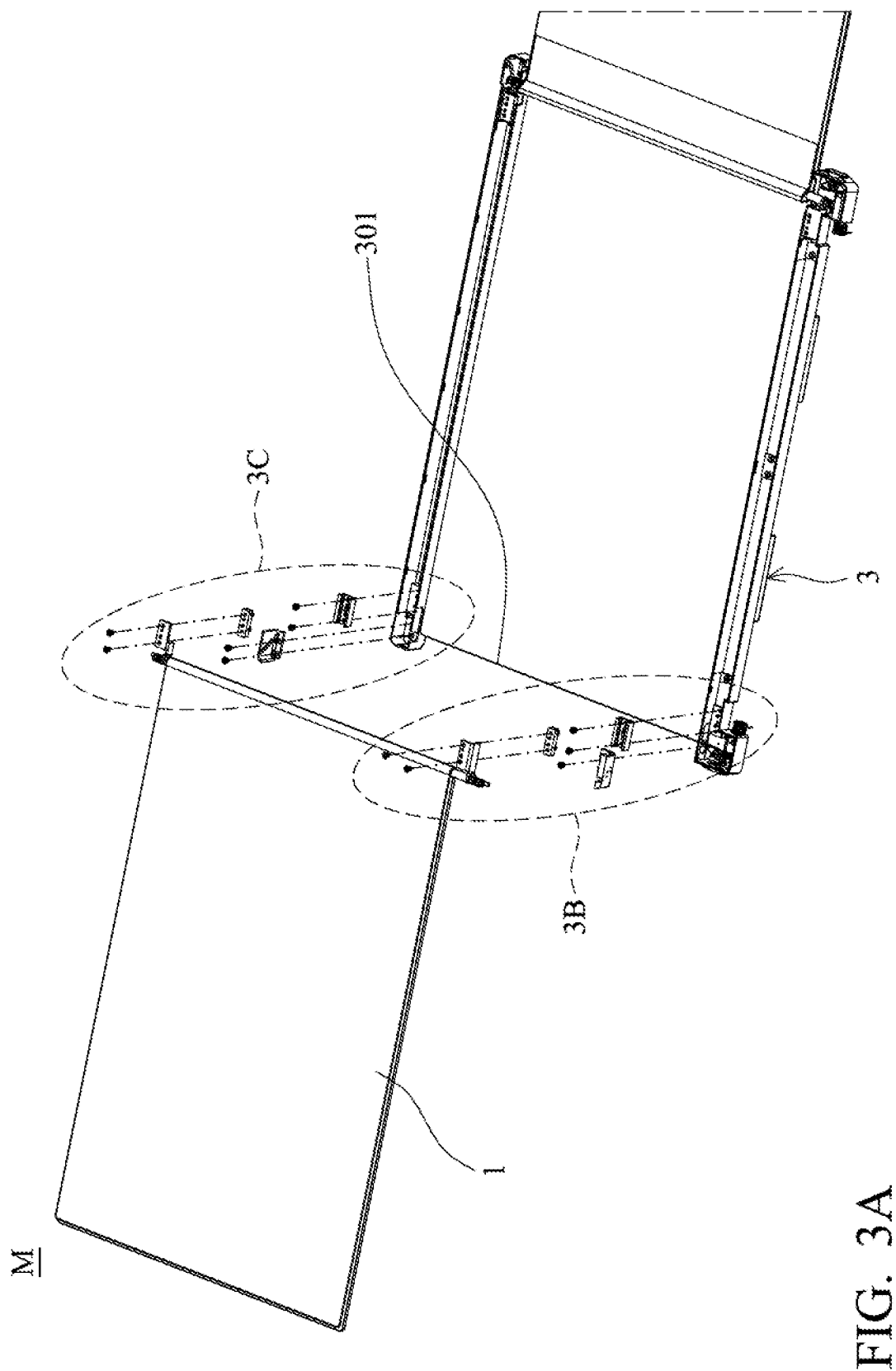
FIG. 3A is an exploded view of a portion of the external display module of the embodiment of the invention.
Figure 3B:
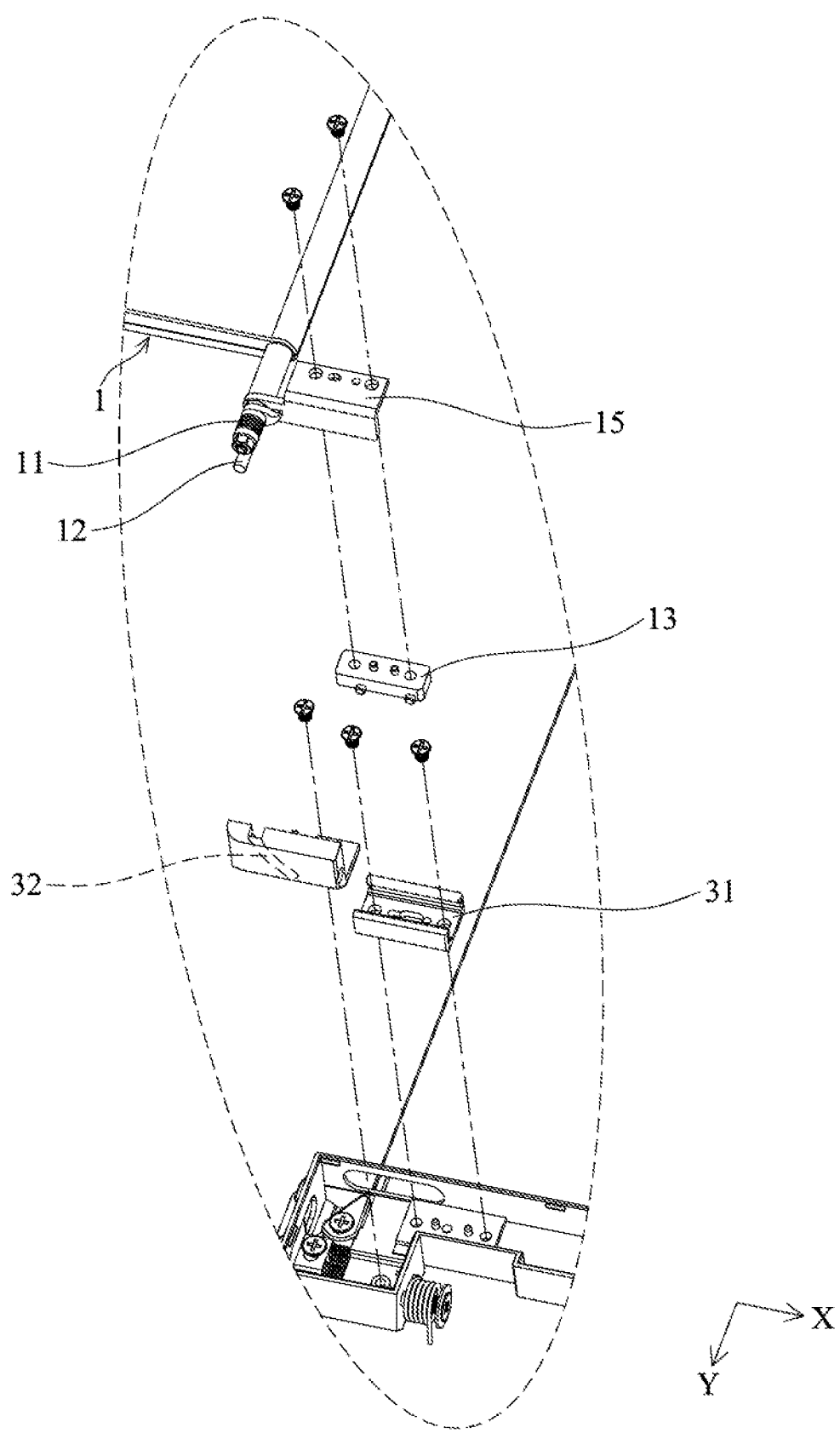
FIG. 3B is an enlarged view of the portion 3B of FIG. 3A.
Figure 3C:
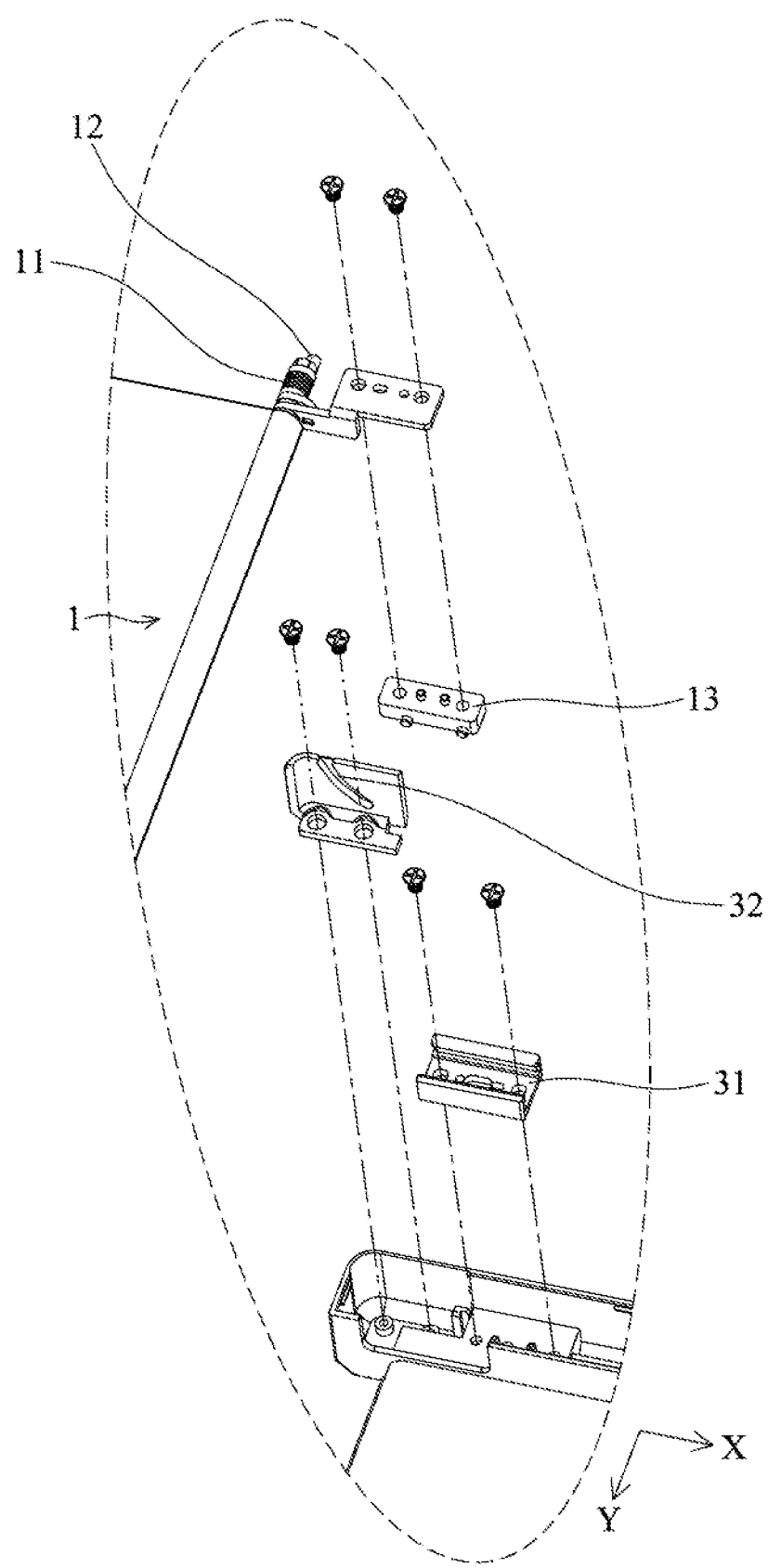
FIG. 3C is an enlarged view of the portion 3C of FIG. 3A.

FIG. 3A is an exploded view of a portion of the external display module of the embodiment of the invention. FIG. 3B is an enlarged view of the portion 3B of FIG. 3A. FIG. 3C is an enlarged view of the portion 3C of FIG. 3A. With reference to FIGS. 2B, 3A, 3B and 3C, the module base 3 includes a first base side 301, two first tracks 31 and at least one first slot 32. The first screen unit 1 is rotatably connected to the module base 3. The first screen unit 1 includes a first screen 19, a first shaft 11, at least one first guiding member 12 and two first blocks 13. The first shaft 11 is disposed on the edge of the first screen unit 1. The first guiding member 12 is affixed to the first shaft 11 and is rotated with the first shaft 11. The first block 13 is connected to the first shaft 11. The first guiding member 12 is inserted into the first slot 32 and is guided by the first slot 32. The first block 13 is adapted to slide in the first track 31. In one embodiment, the first slot 32 can be a curved slot (first curved slot), and the first guiding member 12 can be a post (first guiding post).

Figure 2A:
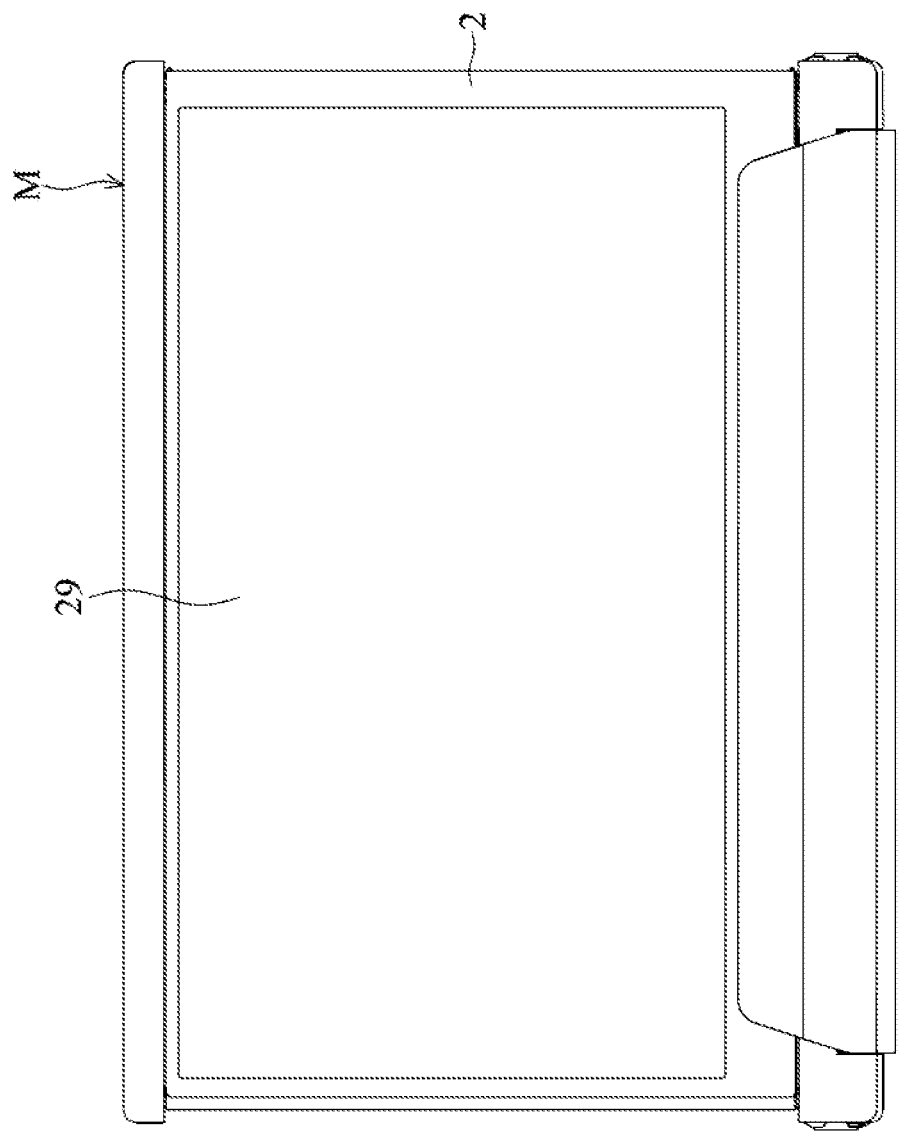
FIGS. 2A, 2B, 2C and 2D show the rotation of the screen units of the external display module of the embodiment of the invention.
Figure 2B:
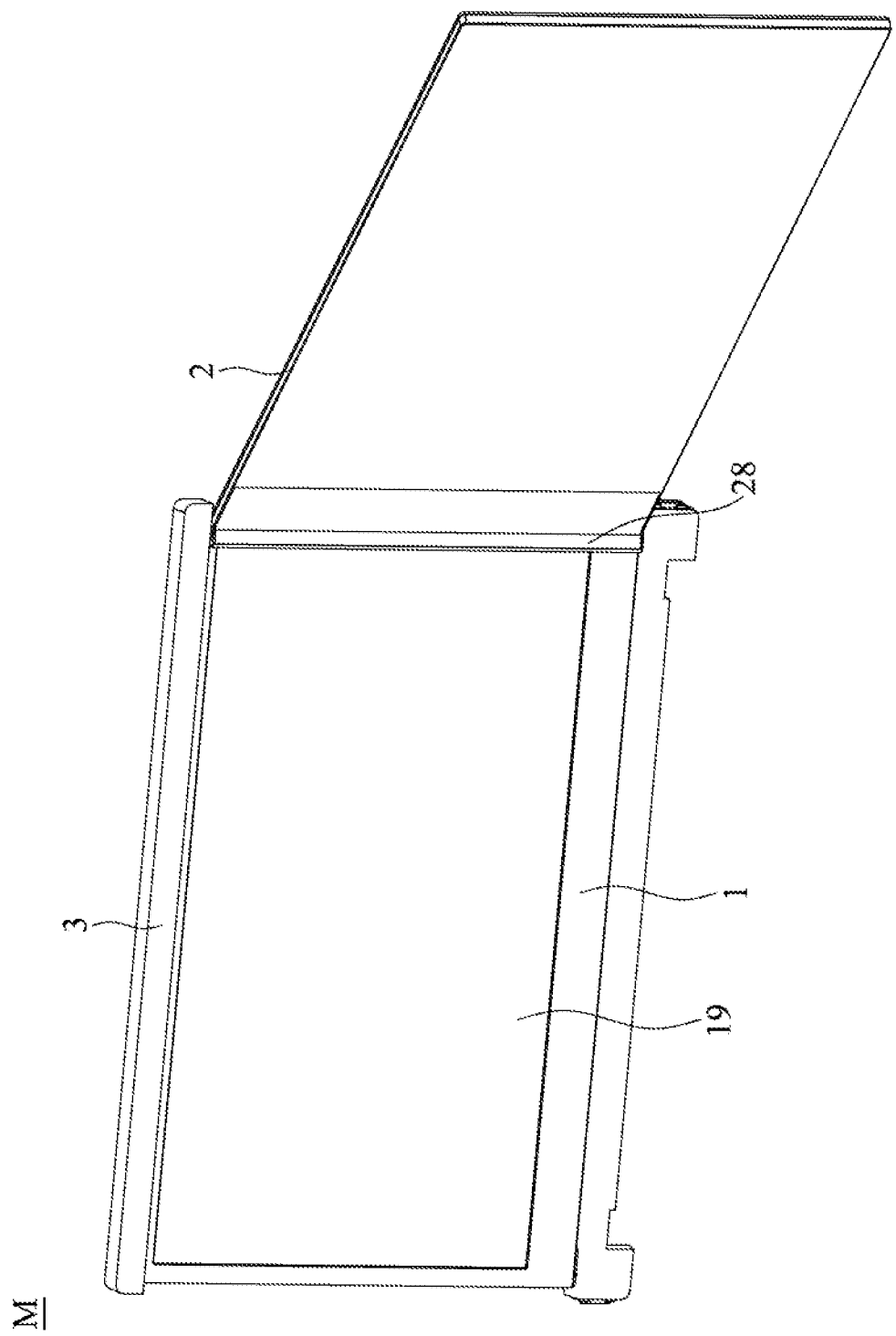
Figure 2C:
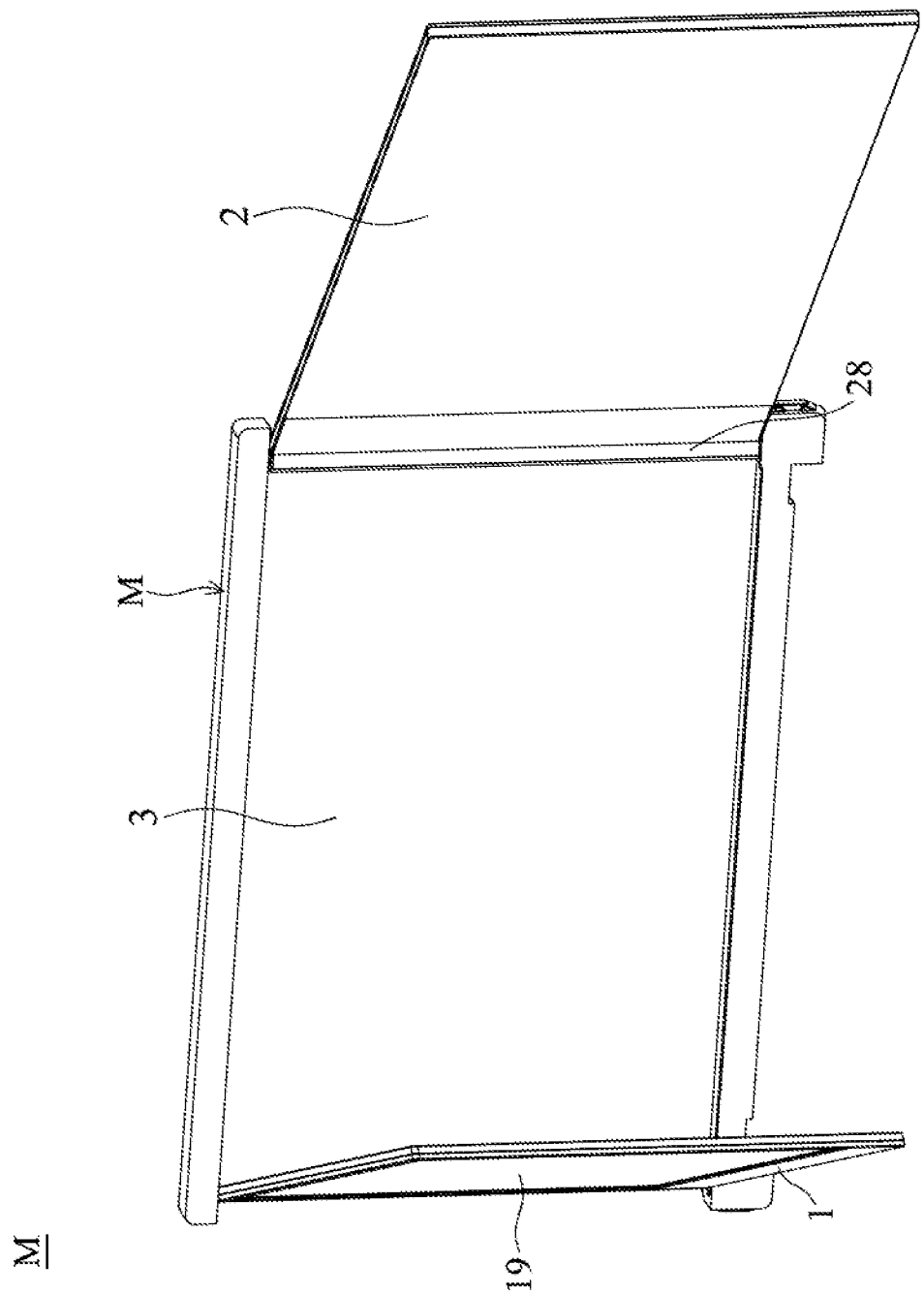
Figure 2D:
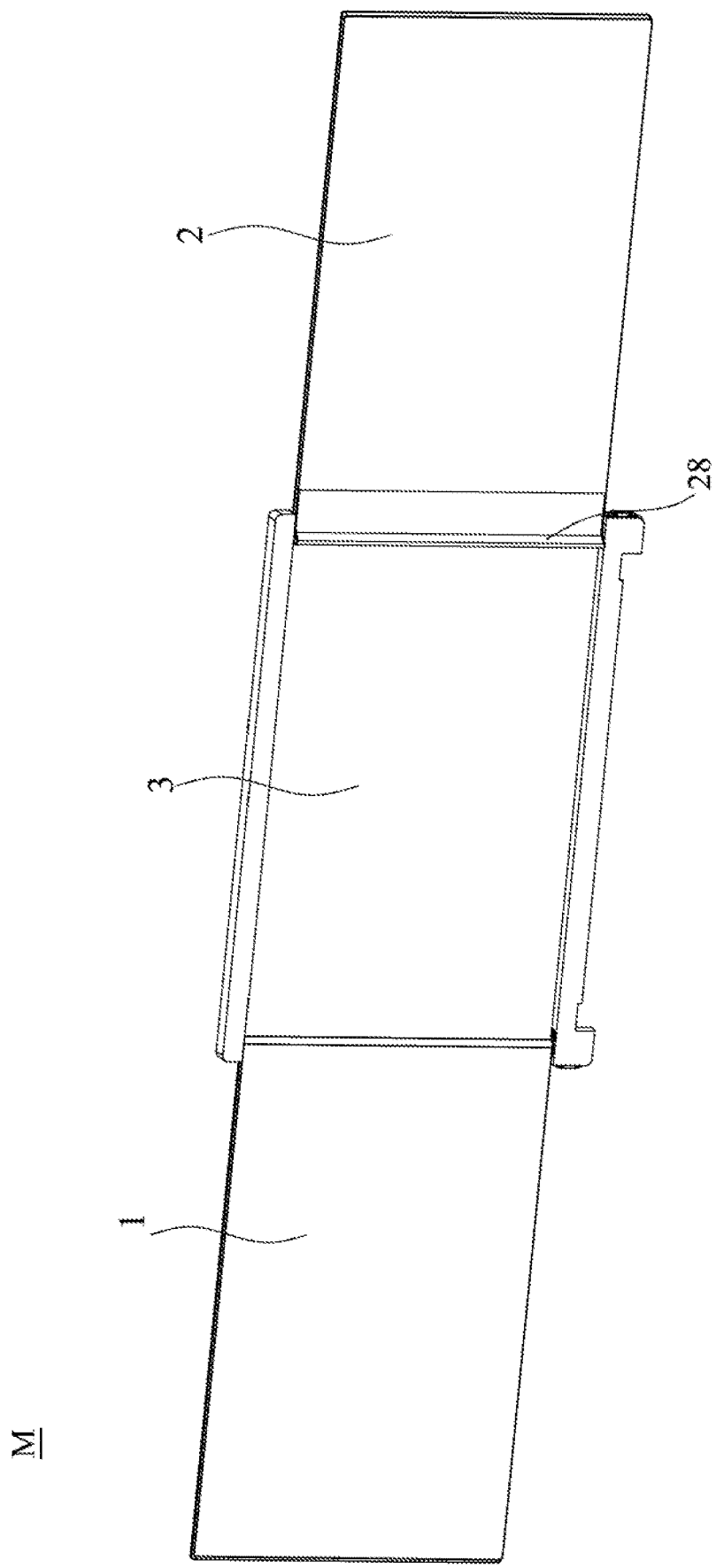

With reference to FIGS. 2B, 2C, 2D and 3A, utilizing the first track 31, the first slot 32, the first guiding member 12 and the first block 13, the edge of the first screen unit 1 is moved toward the first base side 301 while the first screen unit 1 is being rotated from a first folded orientation (FIG. 2B) to a first unfolded orientation (FIG. 2D).

With reference to FIGS. 3B and 3C, in one embodiment, the first screen unit 1 comprises two first extending members 15. The first shaft 11 is rotatably connected to the first extending members 15. The first block 13 is affixed to one of the first extending members 15. In this embodiment, the first block 13 is affixed to one of the first extending members 15 with a bolt.

With reference to FIGS. 3B and 3C, in one embodiment, the first track 31 extends in a first direction X, the first guiding member 12 is inserted into the first slot 32 in a second direction Y, and the second direction Y is perpendicular to the first direction X.

Figure 4A:
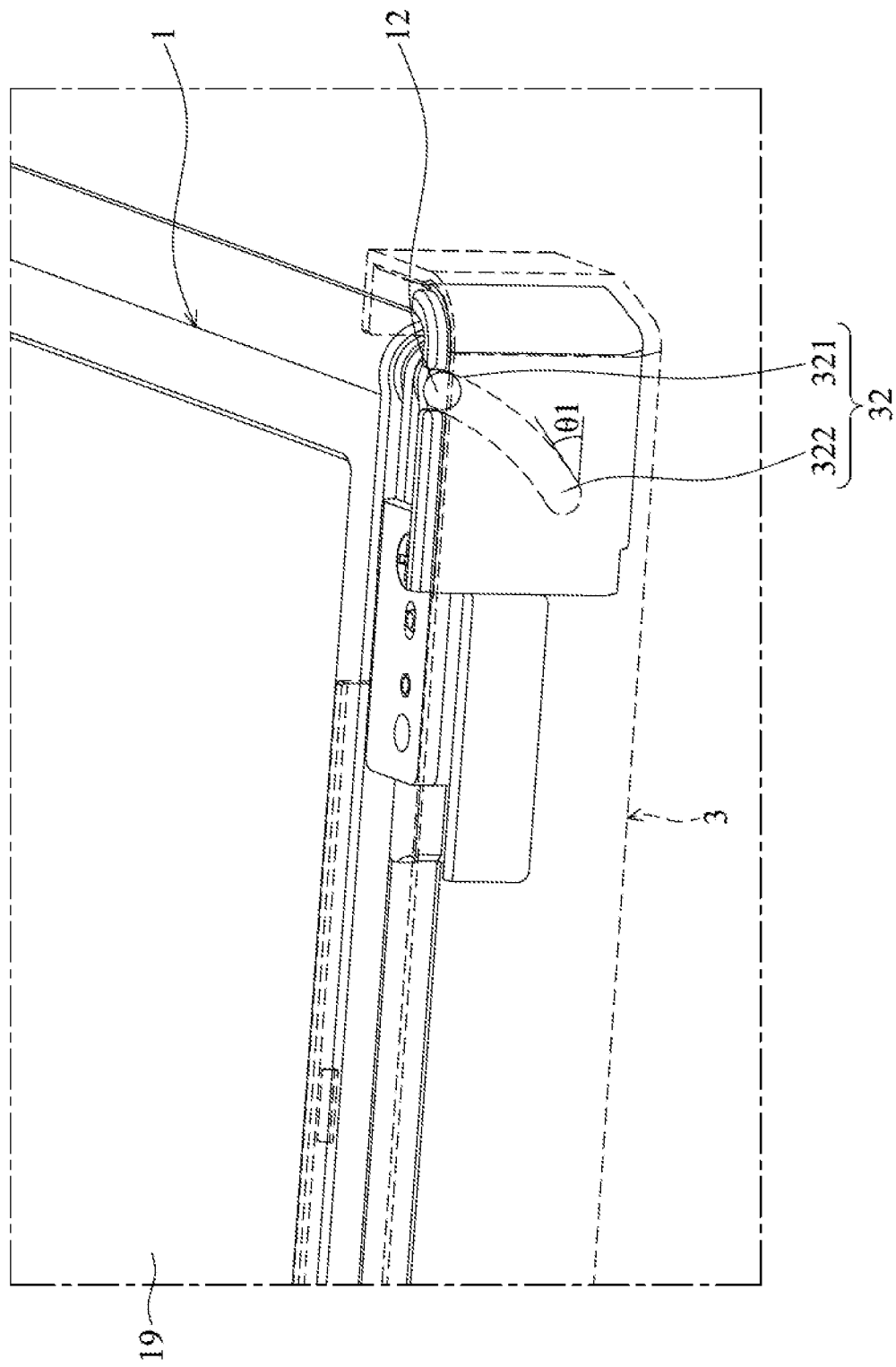
FIGS. 4A and 4B show the relative positions of the first guiding member and the first slot.
Figure 4B:
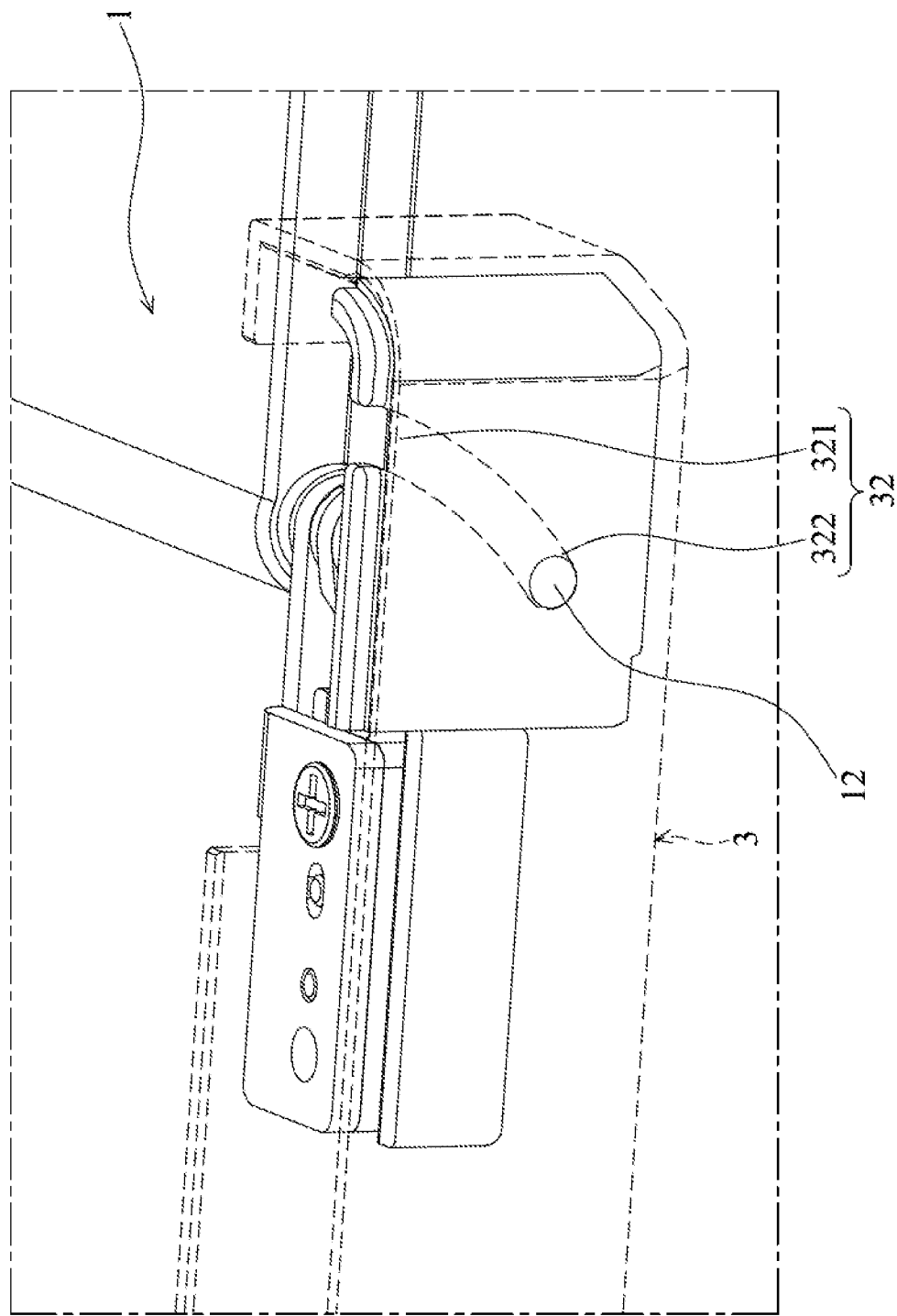

FIGS. 4A and 4B show the relative positions of the first guiding member and the first slot. With reference to FIGS. 4A and 4B, while the first screen unit 1 is being rotated from the first folded orientation to the first unfolded orientation, the first guiding member 12 is guided from a first slot end 321 of the first slot 32 to a second slot end 322 of the first slot 32. The second slot end 322 is adjacent to the first base side relative to the first slot end 321. In one embodiment, an included angle θ1 is formed between an extending direction of the first slot and the first direction. The included angle θ1 is between 20° and 70°. Therefore, the edge of the first screen unit 1 is moved toward the first base side 301 during the rotation of the first screen unit 1 from the first folded orientation to the first unfolded orientation.

Utilizing the first track, the first slot, the first guiding member and the first block of the embodiment of the invention, the edge of the first screen unit is moved toward the first base side while the first screen unit is being rotated from the first folded orientation to the first unfolded orientation. The first screen unit is prevented from being interfered with by the module base during rotation. In the unfolded state, the gap between the first screen of the first screen unit and the screen of the notebook computer is decreased, and the operation experience of user can be improved.

With reference to FIGS. 2A, 2B, 2C and 2D, in one embodiment, the external display module M further comprises a second screen unit 2. The second screen unit 2 is rotatably connected to the module base 3.

Figure 5:
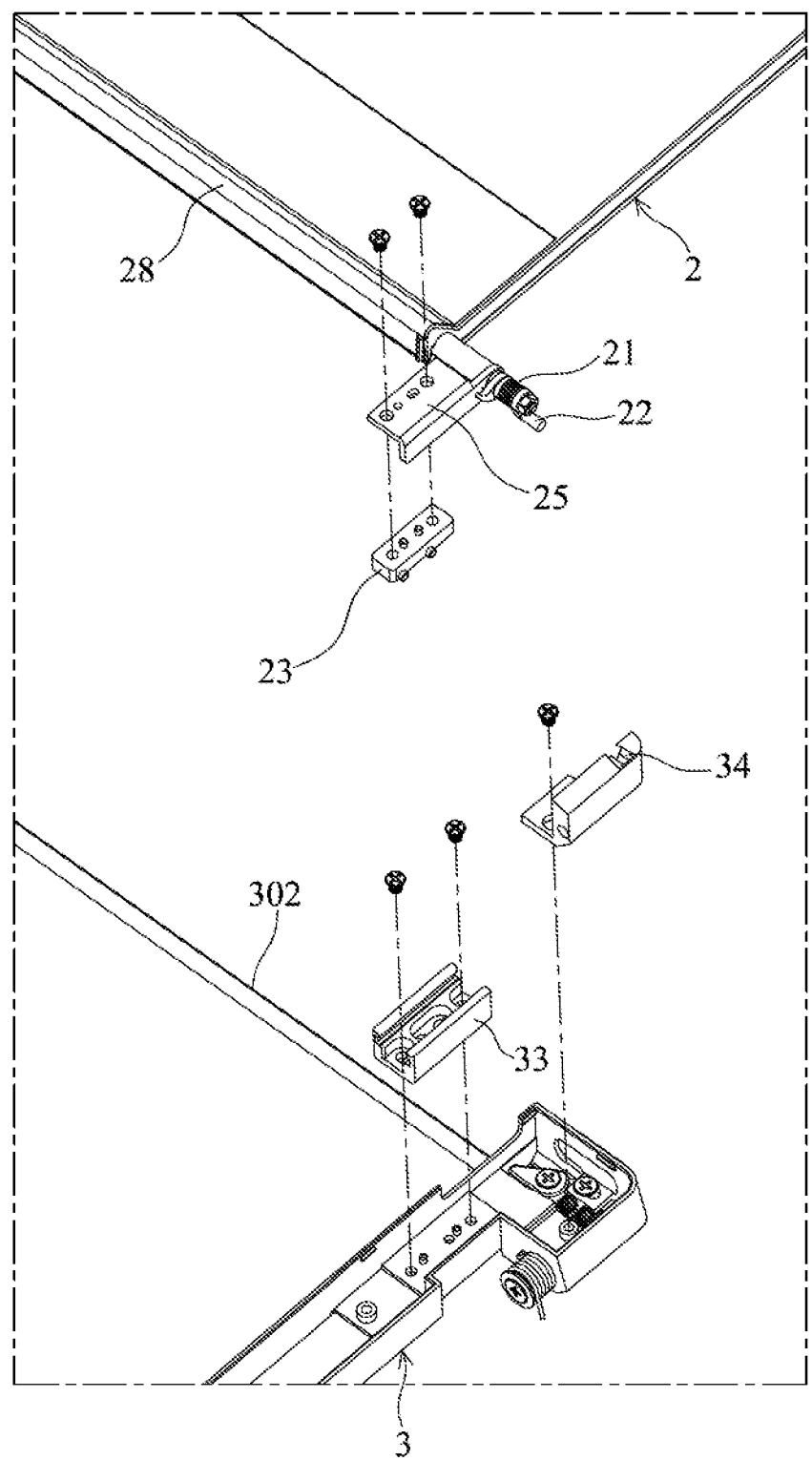
FIG. 5 is an exploded view of another portion of the external display module of the embodiment of the invention.

FIG. 5 is an exploded view of another portion of the external display module of the embodiment of the invention. With reference to FIGS. 2A and 5, the second screen unit 2 comprises a second screen 29, a second shaft 21, at least one second guiding member 22 and two second blocks 23. The second shaft 21 is disposed on the edge of the second screen unit 2. The second guiding member 22 is affixed to the second shaft 21 and is rotated with the second shaft 21. The second block 23 is connected to the second shaft 21. The module base 3 further comprises a second base side 302, two second tracks 33 and at least one second slot 34. The second guiding member 22 is inserted into the second slot 34 and is guided by the second slot 34. The second block 23 is adapted to slide in the second track 33. While the second screen unit is being rotated from a second folded orientation (FIG. 2A) to a second unfolded orientation (FIG. 2D), the edge of the second screen unit 2 is moved toward the second base side 302. In one embodiment, the second slot 34 can be a curved slot (second curved slot), and the second guiding member 22 can be a post (second guiding post).

With reference to FIGS. 2A, 2B, 2C and 2D, in one embodiment, when the first screen unit 1 is in the first folded orientation and the second screen unit 2 is in the second folded orientation (FIG. 2A), at least a portion of the first screen unit 1 is located between the second screen unit 2 and the module base 3.

With reference to FIGS. 2A, 2B, 2C, 2D and 5, in one embodiment, the second screen unit 2 further comprises a unit pushing portion 28. The unit pushing portion 28 is disposed on the edge of the second screen unit 2. While the second screen unit 2 is being rotated from the second folded orientation to the second unfolded orientation (FIGS. 2A and 2B), the unit pushing portion 28 pushes the side of the first screen unit 1 to rotate the first screen unit 1 from the first folded orientation.

Figure 6A:
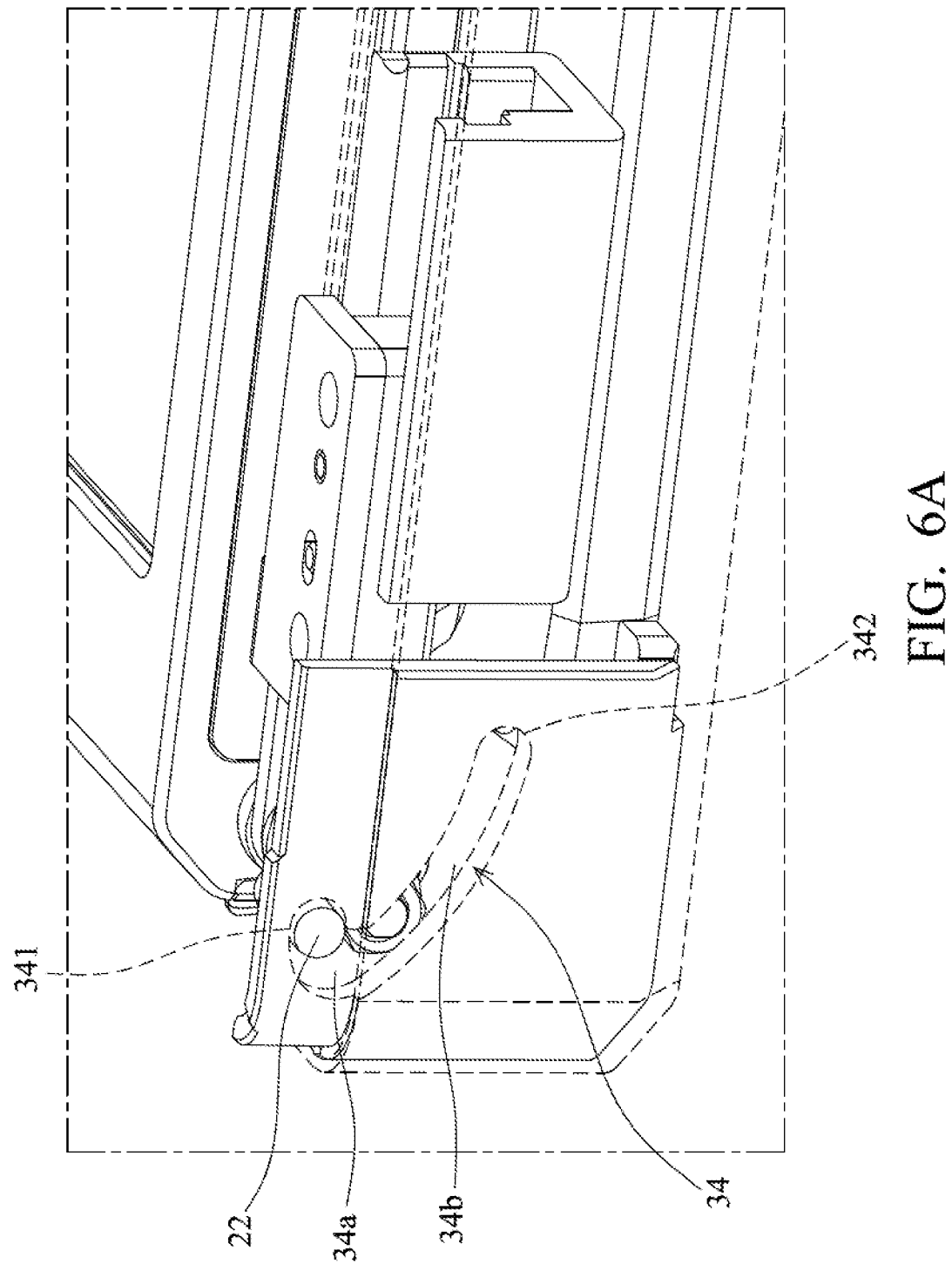
FIGS. 6A, 6B and 6C show the relative positions of the second guiding member and the second slot.
Figure 6B:
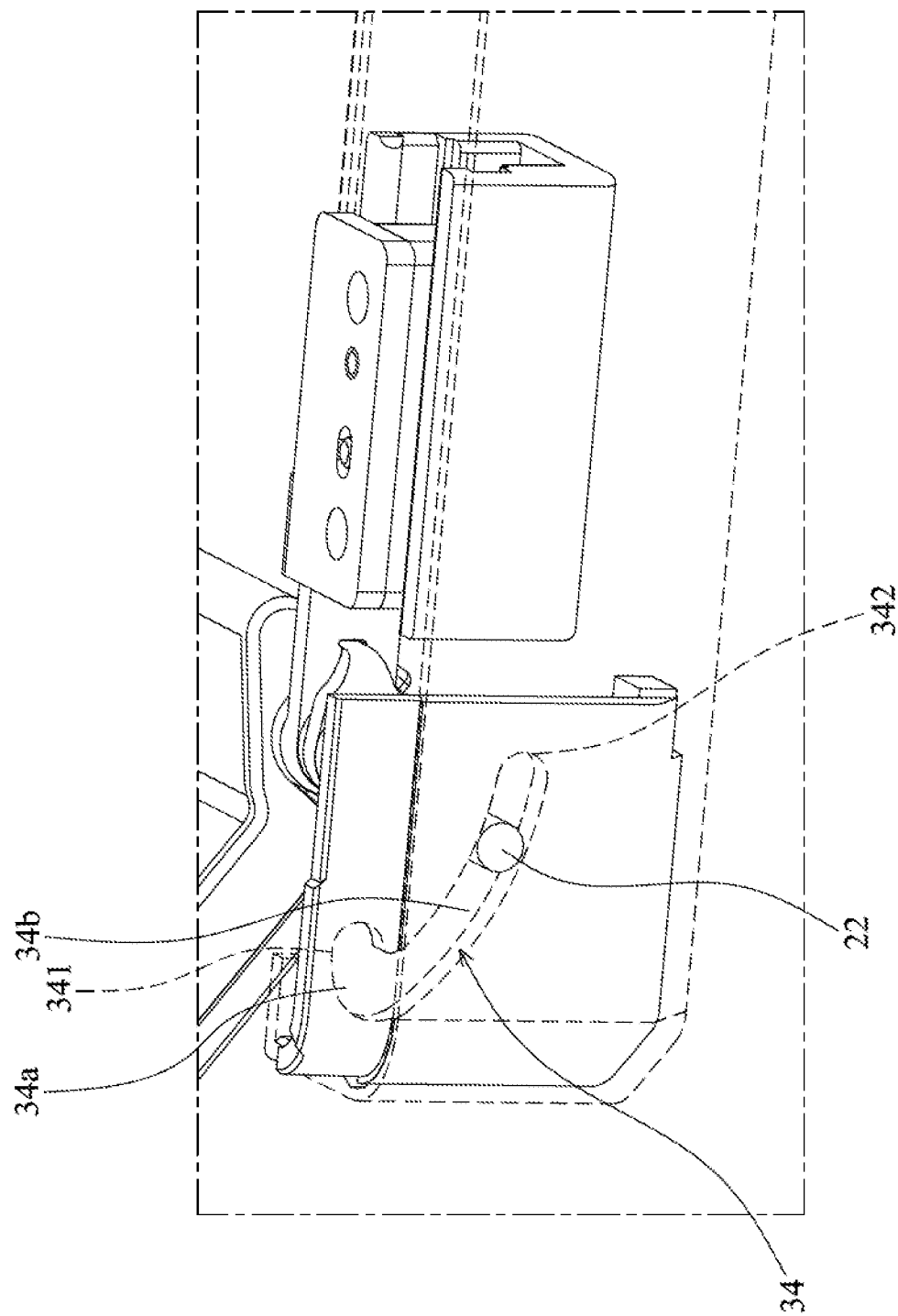
Figure 6C:
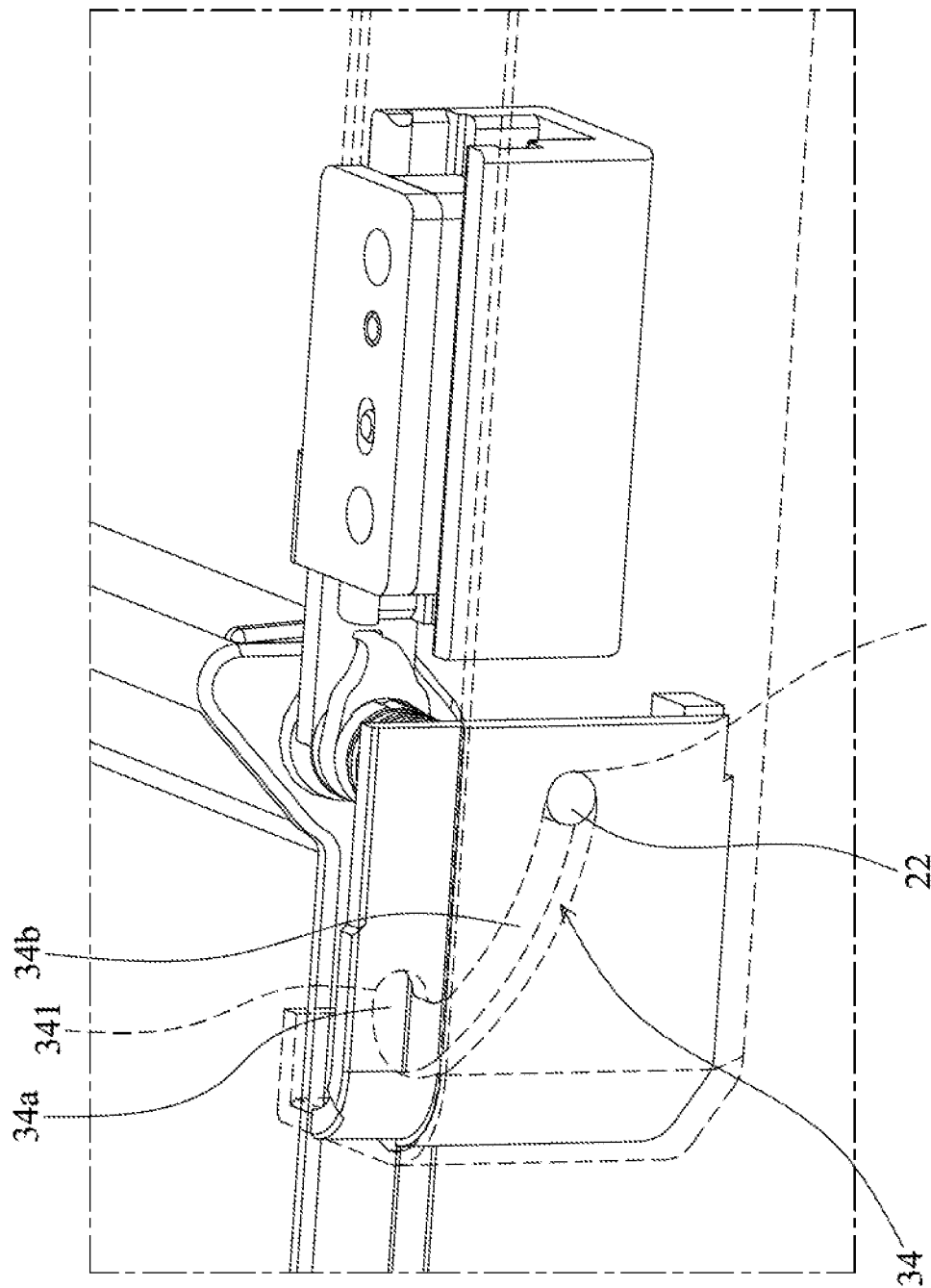

FIGS. 6A, 6B and 6C show the relative positions of the second guiding member and the second slot. With reference to FIGS. 5, 6A, 6B and 6C, in one embodiment, the second screen unit 2 comprises two second extending members 25. The second shaft 21 is rotatably connected to the second extending members 25. The second block 23 is affixed to the second extending member 25. While the second screen unit 2 is being rotated from the second folded orientation to the second unfolded orientation, the second guiding member 22 is guided from a third slot end 341 (FIG. 6A) of the second slot 34 to a fourth slot end 342 (FIG. 6C) of the second slot 34, and the fourth slot end 342 is adjacent to the second base side 302 relative to the third slot end 341.

With reference to FIGS. 6A, 6B and 6C, in one embodiment, the second slot 34 comprises an idling section 34a and a guiding section 34b. The idling section 34a is located on the third slot end 341. While the unit pushing portion 28 is pushing the first screen unit, the second guiding member 22 is moved in the idling section 34a, and the edge of the second screen unit 2 stays without moving toward the second base side 302 (FIG. 6A). After the second guiding member 22 enters the guiding section 34b and is moved toward the fourth slot end 342, the edge of the second screen unit 2 is moved toward the second base side 302 (FIGS. 6B and 6C). Utilizing the idling section 34a, the second screen unit 2 is prevented from being interfered with by the module base 3 during rotation.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An external display module, adapted to be detachably connected to an electronic device, comprising:
    a module base, comprising a first base side, two first tracks and at least one first curved slot;
    a first screen unit, rotatably connected to the module base, wherein the first screen unit comprises a first screen, a first shaft, at least one first guiding post and two first blocks, the first shaft is disposed on an edge of the first screen unit, the first guiding post is affixed to the first shaft and is rotated with the first shaft, the first block is connected to the first shaft, the first guiding post is inserted into the first curved slot and is guided by the first curved slot, and the first block is adapted to slide in the first track,
    wherein while the first screen unit is being rotated from a first folded orientation to a first unfolded orientation, the edge of the first screen unit is moved toward the first base side.

2. The external display module as claimed in claim 1, wherein the first screen unit comprises two first extending members, the first shaft is rotatably connected to the first extending members, and the first block is affixed to one of the first extending members.

3. The external display module as claimed in claim 2, wherein the first track extends in a first direction, the first guiding post is inserted into the first curved slot in a second direction, and the second direction is perpendicular to the first direction.

4. The external display module as claimed in claim 3, wherein while the first screen unit is being rotated from the first folded orientation to the first unfolded orientation, the first guiding post is guided from a first slot end of the first curved slot to a second slot end of the first curved slot, the second slot end is adjacent to the first base side relative to the first slot end, and an included angle is formed between an extending direction of the first curved slot and the first direction.

5. The external display module as claimed in claim 4, wherein the included angle is between 20° and 70°.

6. The external display module as claimed in claim 1, further comprising:
    a second screen unit, rotatably connected to the module base, wherein the second screen unit comprises a second screen, a second shaft, at least one second guiding post and two second blocks, the second shaft is disposed on an edge of the second screen unit, the second guiding post is affixed to the second shaft and is rotated with the second shaft, and the second block is connected to the second shaft,
    wherein the module base further comprises a second base side, two second tracks and at least one second curved slot, the second guiding post is inserted into the second curved slot and is guided by the second curved slot, and the second block is adapted to slide in the second track,
    wherein while the second screen unit is being rotated from a second folded orientation to a second unfolded orientation, the edge of the second screen unit is moved toward the second base side.

7. The external display module as claimed in claim 6, wherein when the first screen unit is in the first folded orientation and the second screen unit is in the second folded orientation, at least a portion of the first screen unit is located between the second screen unit and the module base.

8. The external display module as claimed in claim 7, wherein the second screen unit further comprises a unit pushing portion, the unit pushing portion is disposed on the edge of the second screen unit, and while the second screen unit is being rotated from the second folded orientation to the second unfolded orientation, the unit pushing portion pushes a side of the first screen unit to rotate the first screen unit from the first folded orientation.

9. The external display module as claimed in claim 8, wherein the second screen unit comprises two second extending members, the second shaft is rotatably connected to the second extending members, and the second block is affixed to the second extending member, wherein while the second screen unit is being rotated from the second folded orientation to the second unfolded orientation, the second guiding post is guided from a third slot end of the second curved slot to a fourth slot end of the second curved slot, and the fourth slot end is adjacent to the second base side relative to the third slot end.

10. The external display module as claimed in claim 9, wherein the second curved slot comprises an idling section and a guiding section, and the idling section is located on the third slot end, wherein while the unit pushing portion is pushing the first screen unit, the second guiding post is moved in the idling section, and the edge of the second screen unit stays without moving toward the second base side, wherein after the second guiding post enters the guiding section and is moved toward the fourth slot end, the edge of the second screen unit is moved toward the second base side.

* * * * *